United States Patent
Watanabe et al.

(10) Patent No.: US 10,437,372 B2
(45) Date of Patent: *Oct. 8, 2019

(54) ELECTRONIC DEVICE

(71) Applicant: Japan Display Inc., Tokyo (JP)

(72) Inventors: Yoshihiro Watanabe, Tokyo (JP);
Yoshikatsu Imazeki, Tokyo (JP);
Yoichi Kamijo, Tokyo (JP); Shuichi Osawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,786

(22) Filed: Mar. 13, 2019

(65) Prior Publication Data

US 2019/0204976 A1    Jul. 4, 2019

Related U.S. Application Data

(63) Continuation of application No. 15/660,317, filed on Jul. 26, 2017, now Pat. No. 10,268,299.

(30) Foreign Application Priority Data

Jul. 29, 2016    (JP) ................................. 2016-149611

(51) Int. Cl.
*G06F 3/041*    (2006.01)
*G02F 1/1345*    (2006.01)
*G06F 3/044*    (2006.01)
*G02F 1/1333*    (2006.01)

(52) U.S. Cl.
CPC ........ *G06F 3/0412* (2013.01); *G02F 1/13338* (2013.01); *G02F 1/13452* (2013.01); *G06F 3/044* (2013.01); *G06F 2203/04103* (2013.01); *G06F 2203/04107* (2013.01); *G06F 2203/04111* (2013.01)

(58) Field of Classification Search
USPC .................................................. 345/170–178
See application file for complete search history.

(56) References Cited

U.S. PATENT DOCUMENTS

| 10,034,374 | B2 | 7/2018 | Koide |
| 2018/0031932 | A1 | 2/2018 | Koide |
| 2018/0031933 | A1 | 2/2018 | Osawa et al. |
| 2018/0031934 | A1 | 2/2018 | Watanabe et al. |
| 2018/0031938 | A1 | 2/2018 | Watanabe et al. |
| 2018/0031939 | A1 | 2/2018 | Imazeki |

(Continued)

FOREIGN PATENT DOCUMENTS

JP    2002-40465 A    2/2002

*Primary Examiner* — Tony O Davis
(74) *Attorney, Agent, or Firm* — K&L Gates LLP

(57) ABSTRACT

According to one embodiment, an electronic device includes a first substrate, a second substrate and a connecting material. The first substrate includes a first basement and a first conductive layer. The second substrate includes a second basement having a first hole a second conductive layer having a second hole. The first surface of the second basement opposes the first conductive layer and is spaced therefrom. The second surface opposite to the first surface includes a first flat portion exposed from the second conductive layer. The connecting material is filled into the first hole electrically connect the first conductive layer and the second conductive layer to each other.

16 Claims, 12 Drawing Sheets

(56) References Cited

U.S. PATENT DOCUMENTS

| | | |
|---|---|---|
| 2018/0032175 A1 | 2/2018 | Imazeki |
| 2018/0032192 A1* | 2/2018 | Watanabe ............. G06F 3/0412 |
| 2018/0032194 A1 | 2/2018 | Koide |
| 2018/0032204 A1 | 2/2018 | Imazeki |
| 2018/0033617 A1 | 2/2018 | Imazeki et al. |
| 2018/0033800 A1 | 2/2018 | Koide |
| 2018/0033801 A1 | 2/2018 | Koide |
| 2018/0033969 A1 | 2/2018 | Kamijo et al. |
| 2018/0035540 A1 | 2/2018 | Koide |
| 2018/0035541 A1 | 2/2018 | Kamijo et al. |
| 2018/0035542 A1 | 2/2018 | Osawa et al. |
| 2018/0088402 A1 | 3/2018 | Song |
| 2018/0120993 A1 | 5/2018 | Kurasawa et al. |
| 2018/0210262 A1 | 7/2018 | Osawa et al. |
| 2018/0212550 A1 | 7/2018 | Imazeki et al. |
| 2018/0213638 A1 | 7/2018 | Osawa et al. |

* cited by examiner

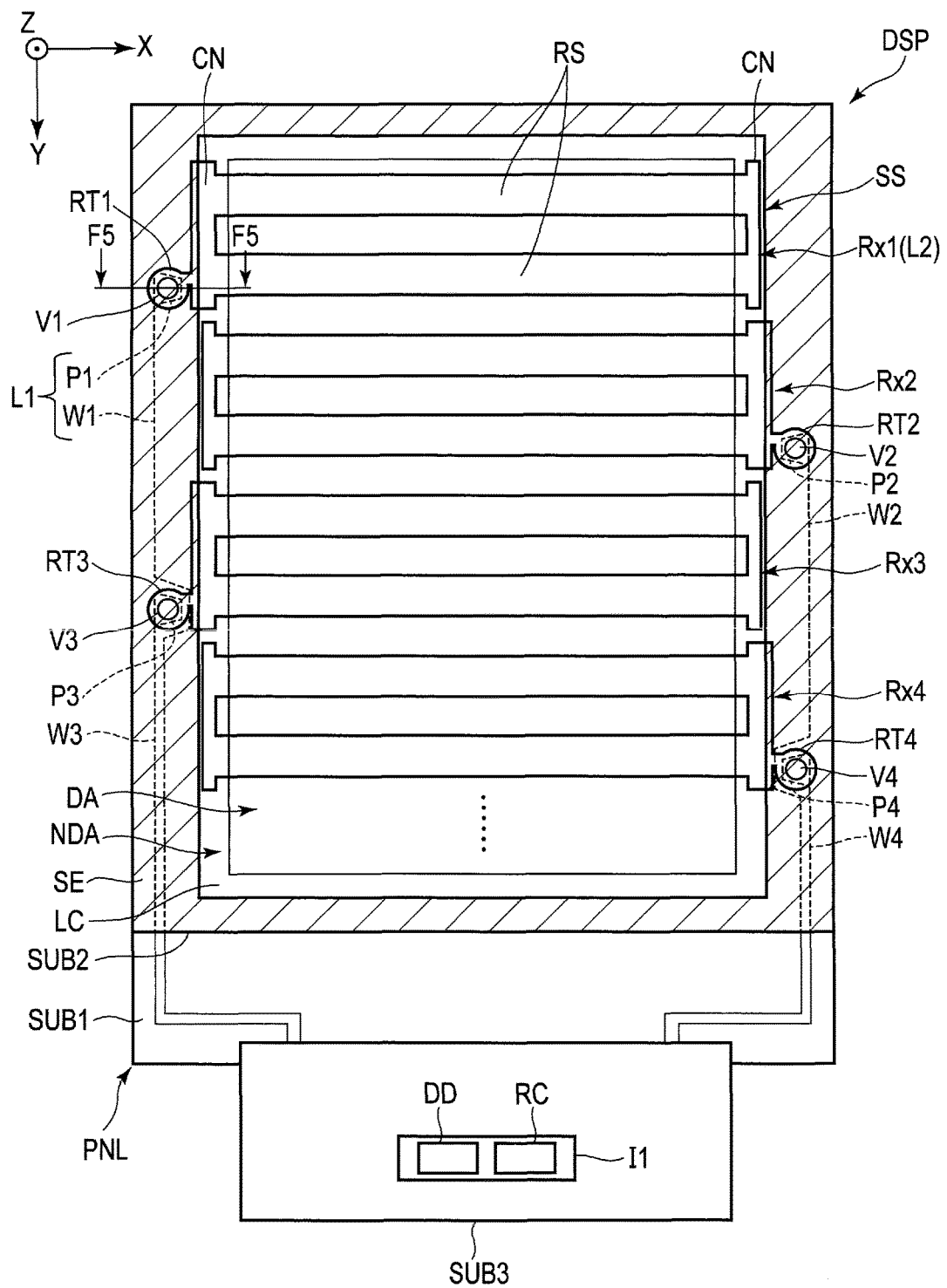
F I G. 1

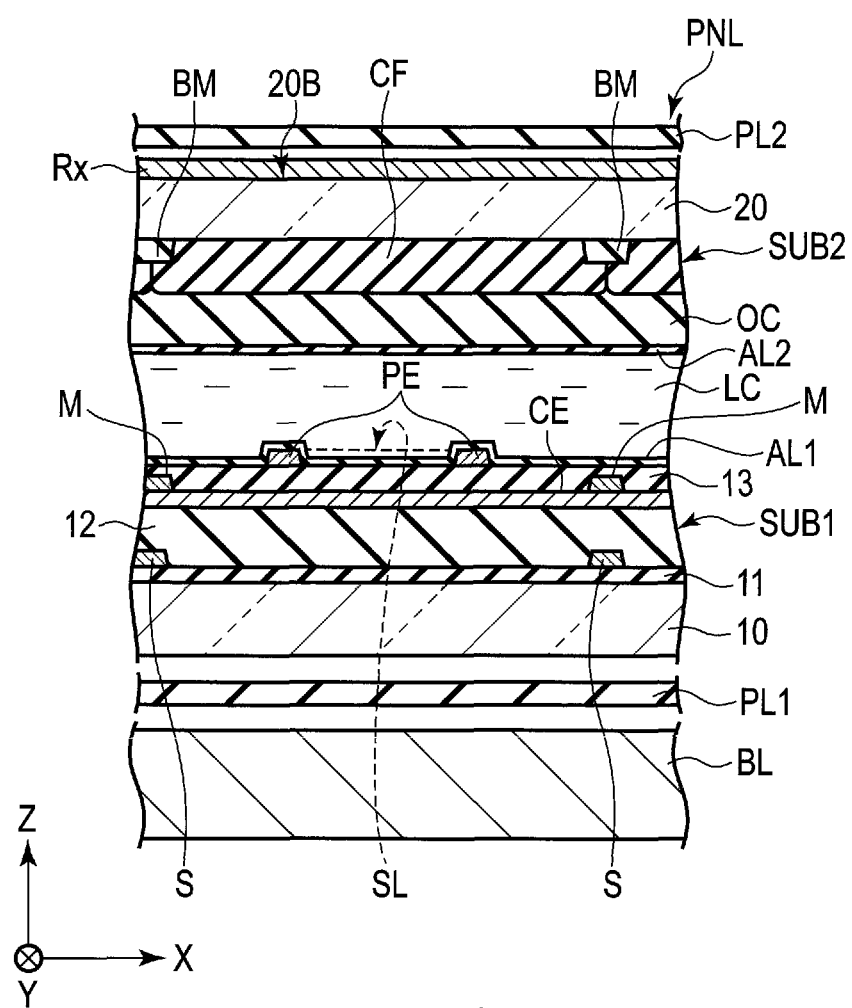
F I G. 3

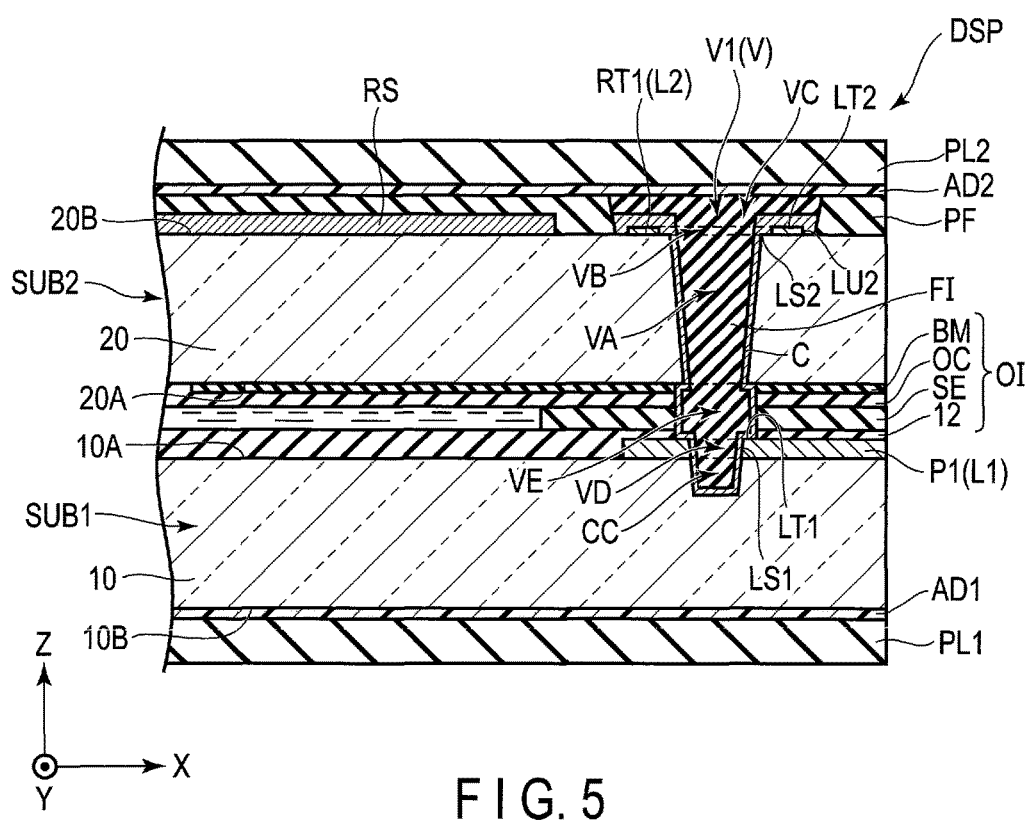
F I G. 5

| Example of material and melting point |||
|---|---|---|
| | Material | Melting point (°C) |
| Metal material | Indium | 157 |
| | Aluminum | 660 |
| | Titanium | 1666 |
| | Niobium | 2477 |
| | Molybdenum | 2623 |
| | Tungsten | 3407 |
| Glass material | Silicon | 1414 |
| | Quartz glass | 1650 |
F I G. 6
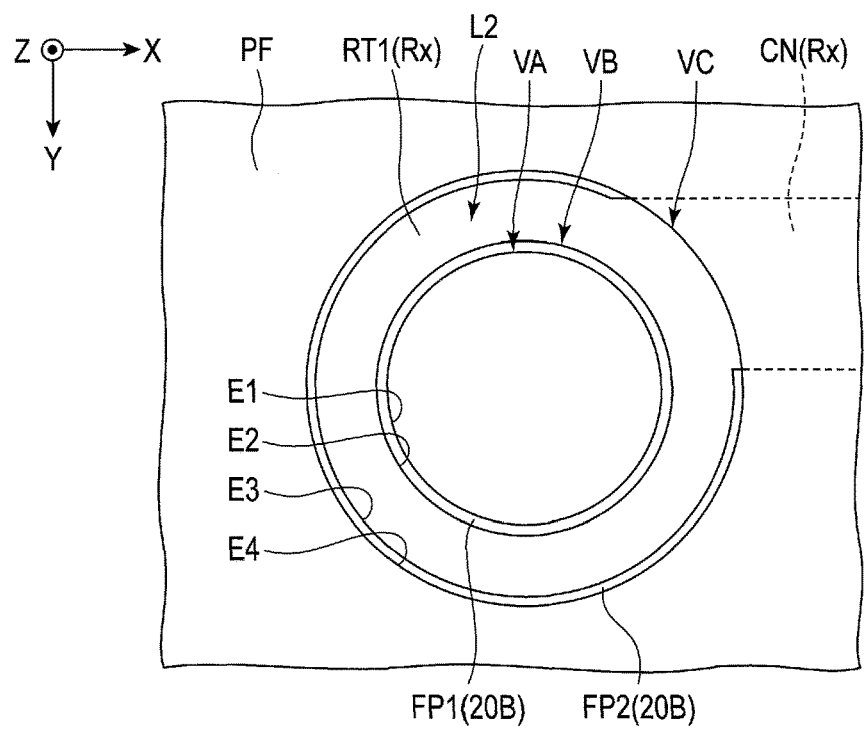
F I G. 7

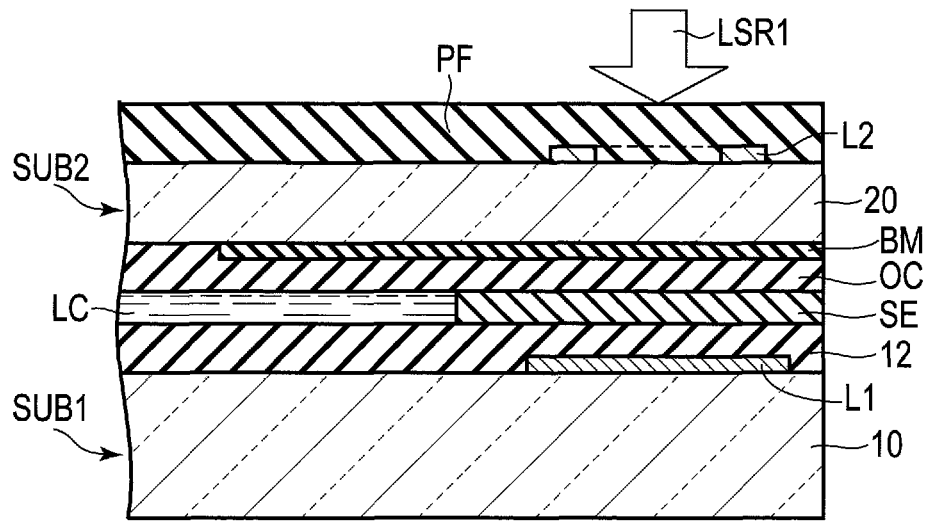
F I G. 10
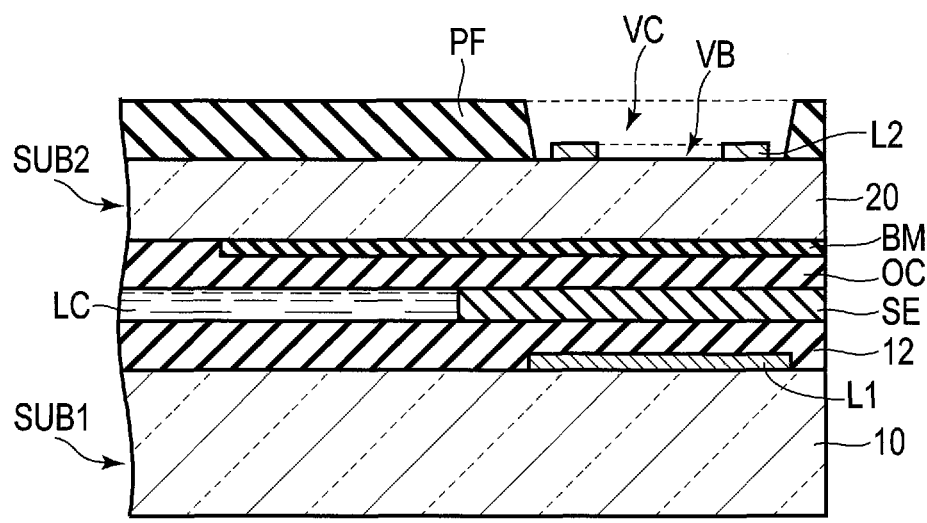
F I G. 11

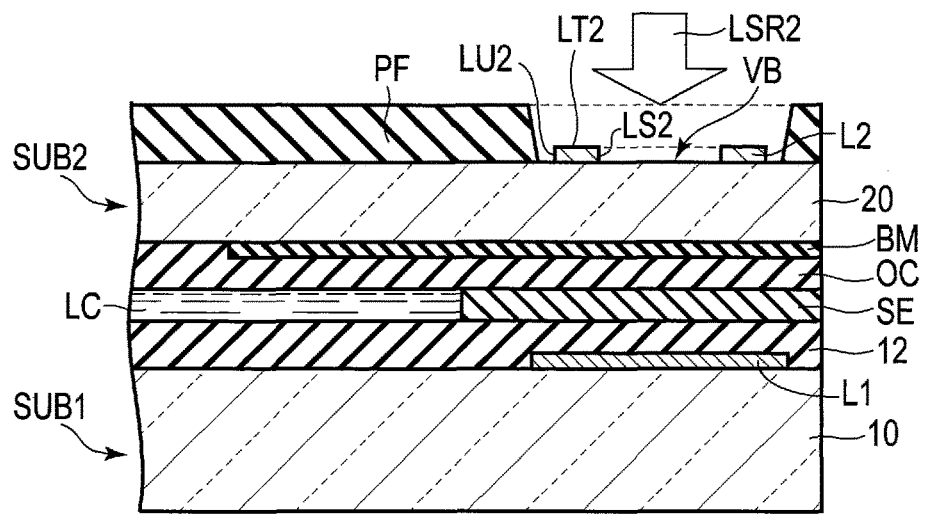
F I G. 12
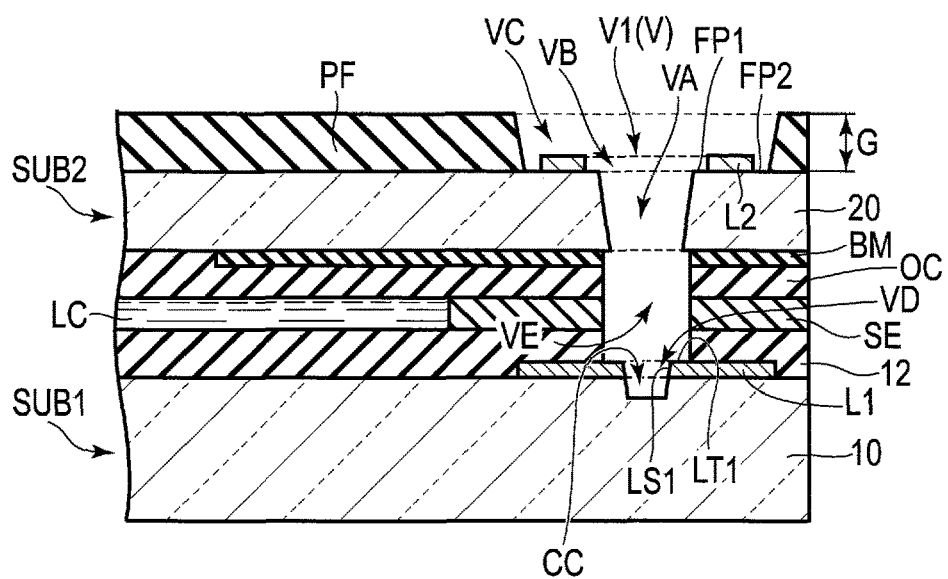
F I G. 13

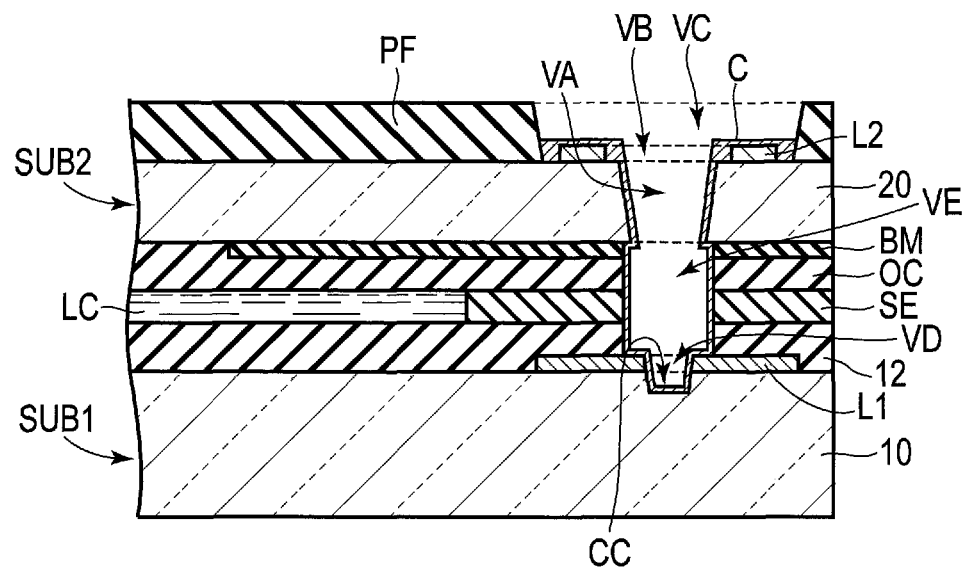
F I G. 16
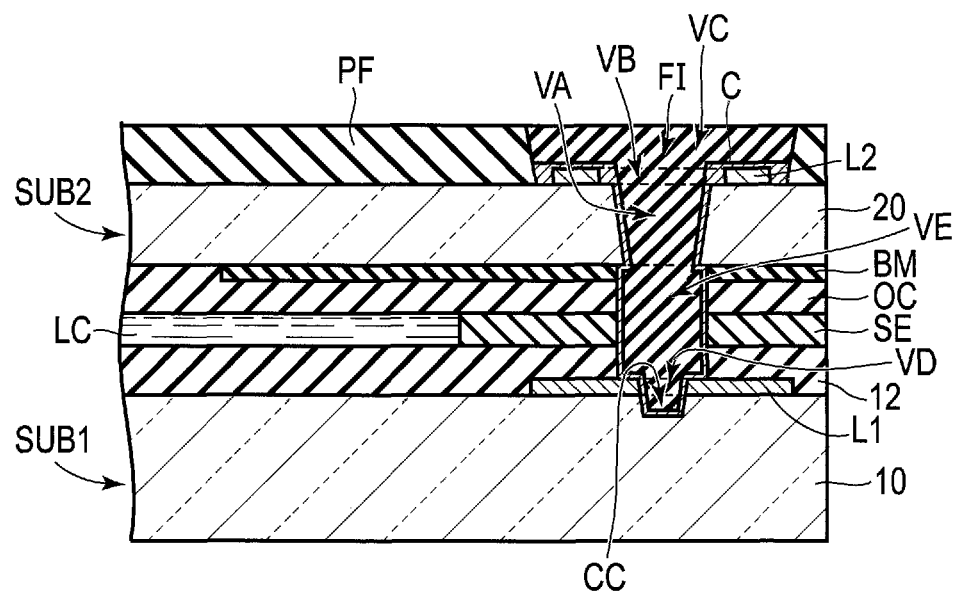
F I G. 17

ELECTRONIC DEVICE

CROSS-REFERENCE TO RELATED APPLICATIONS

This application is a continuation from U.S. application Ser. No. 15/660,317, filed Jul. 26, 2017, which is based upon and claims the benefit of priority from Japanese Patent Application No. 2016-149611, filed Jul. 29, 2016, the entire contents of which are incorporated herein by reference.

FIELD

Embodiments described herein relate generally to an electric device and method for manufacturing the same.

BACKGROUND

In electronic devices, a demand for high efficiency and low cost of wiring mounting has been further increased. For example, a technique that relates to a display device which is an example of an electronic device and electrically connects a wiring portion having an in-hole connector provided inside a hole penetrating an inner surface and an outer surface of a first substrate formed of a resin and a wiring portion provided on an inner surface of a second substrate formed of a resin by an inter-substrate connector is disclosed (for example, JP 2002-40465 A).

SUMMARY

The present disclosure relates generally to an electric device and method for manufacturing the same. According to one embodiment, an electronic device includes a first substrate, a second substrate and a connecting material. The first substrate includes a first basement and a first conductive layer. The second substrate includes a second basement having a first hole a second conductive layer having a second hole. The first surface of the second basement opposes the first conductive layer and is spaced therefrom. The second surface opposite to the first surface includes a first flat portion exposed from the second conductive layer. The connecting material is filled into the first hole electrically connect the first conductive layer and the second conductive layer to each other. Additional features and advantages are described herein, and will be apparent from the following Detailed Description and the figures.

BRIEF DESCRIPTION OF THE DRAWINGS

FIG. 1 is a plan view illustrating a configuration example of a display device DSP of a first embodiment;

FIG. 3 is a cross-sectional view illustrating a structure of a display area DA of the display panel PNL illustrated in FIG. 1;

FIG. 5 is a cross-sectional view taken along line F5-F5 in FIG. 1;

FIG. 6 is a view illustrating an example of melting points of materials of first and second conductive layers L1 and L2 and first and second basements 10 and 20 illustrated in FIG. 5;

FIG. 7 is a plan view of a contact hole V illustrated in FIG. 5 when viewed from a second substrate SUB2 side;

FIG. 10 is a cross-sectional view for describing the method for manufacturing a display device DSP subsequent to FIG. 9;

FIG. 11 is a cross-sectional view for describing the method for manufacturing a display device DSP subsequent to FIG. 10;

FIG. 12 is a cross-sectional view for describing the method for manufacturing a display device DSP subsequent to FIG. 11;

FIG. 13 is a cross-sectional view for describing the method for manufacturing a display device DSP subsequent to FIG. 12;

FIG. 16 is a cross-sectional view for describing the method for manufacturing a display device DSP subsequent to FIG. 15;

FIG. 17 is a cross-sectional view for describing the method for manufacturing a display device DSP subsequent to FIG. 16;

DETAILED DESCRIPTION

Figure 2:
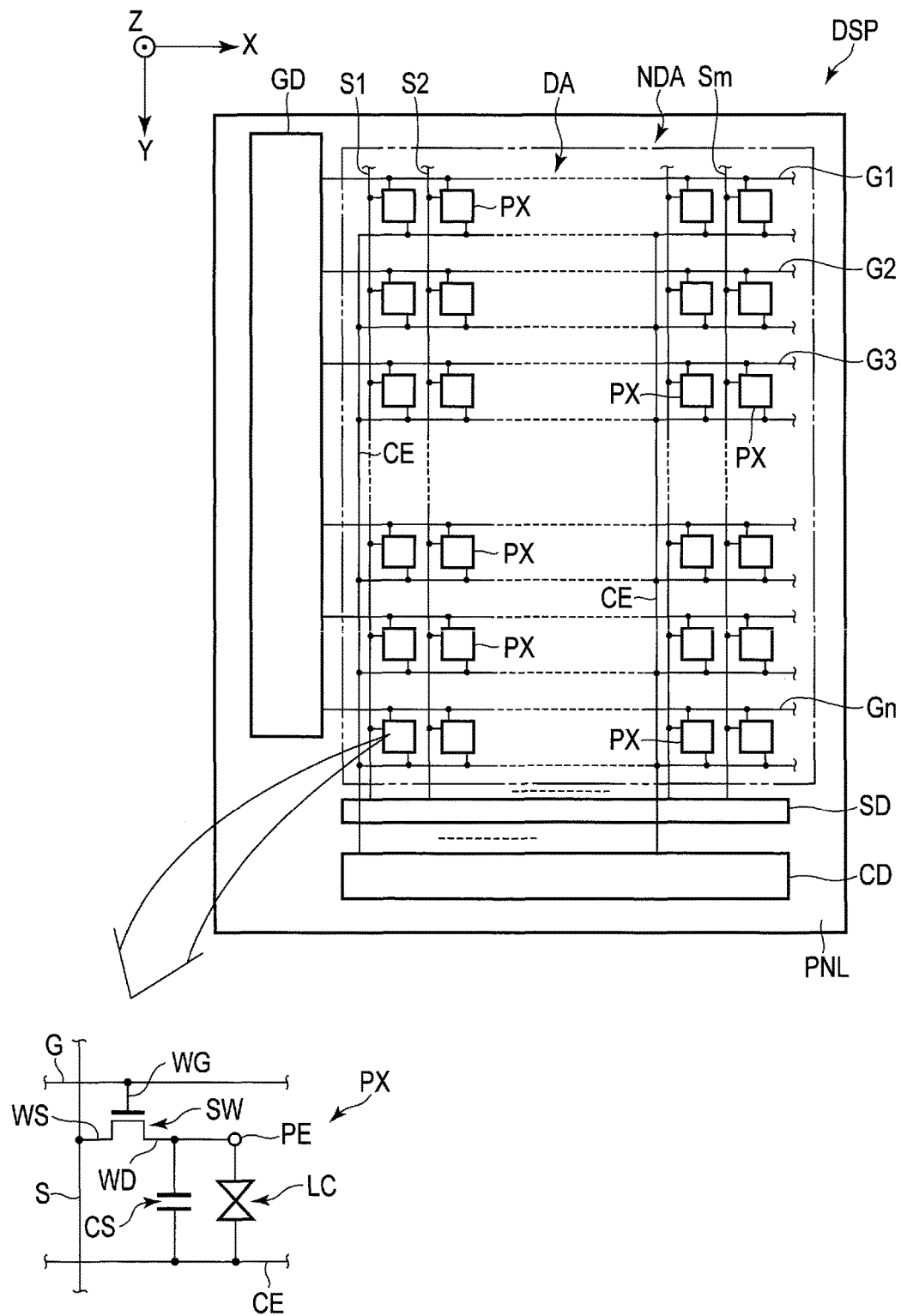
FIG. 2 is a plan view schematically illustrating a basic configuration and an equivalent circuit of the display panel PNL illustrated in FIG. 1.

In general, according to one embodiment, an electronic device includes a first substrate, a second substrate, and a connecting material. The first substrate includes a first basement and a first conductive layer. The second substrate includes a second basement having a first hole and a second conductive layer having a second hole larger than the first hole. A first main surface of the second basement is opposed to the first conductive layer and is spaced apart from the first conductive layer. The second main surface opposite to the first main surface has a first flat portion exposed from the second conductive layer between an edge of the first hole and an edge of the second hole. The connecting material is filled in the first hole and electrically connects the first conductive layer and the second conductive layer via the first hole.

In addition, according to one embodiment, a method of manufacturing an electronic device, includes preparing a display panel, forming a first hole and placing a connecting material. Preparing a display panel including a first basement on which a first conductive layer is formed, and a second basement including a first main surface opposing the first conductive layer and a second main surface opposite to the first main surface, adhered to each other, and further including a second conductive layer over the second main surface, which covers the second main surface and a first flat portion which expose the second main surface via the second conductive layer. Forming a first hole penetrating from the second main surface to the first main surface in the first flat portion. Placing a connecting material in the first hole to electrically connect the first conductive layer and the second conductive layer to each other.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, and the like of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

In each embodiment, a display device is disclosed as an example of an electronic device. The display device can be used for various devices such as a smart phone, a tablet terminal, a mobile phone terminal, a notebook type personal computer, and a game machine. Main components disclosed in each embodiment can be applied to a liquid crystal display device, a self-luminous display device such as an organic electroluminescence display device, an electronic paper type display device having an electrophoretic element and the like, a display device to which micro electro mechanical systems (MEMS) is applied, or a display device to which electrochromism is applied, and the like.

Further, the electronic device is not limited to the display device, and may be, for example, an external type touch panel substrate that is overlaid and attached on the display device. The present invention can be applied to various electronic devices including an inter-substrate conducting structure in which a first basement and a second basement are disposed to be spaced apart from each other, the second basement has a first hole, a first conductive layer located over the first basement and a second conductive layer located on the second substrate are electrically connected to each other via the first hole.

First Embodiment

FIG. 1 is a plan view illustrating an example of a display device DSP of a first embodiment. A first direction X, a second direction Y, and a third direction Z are orthogonal to each other, but may intersect with each other at an angle other than 90°. The first direction X and the second direction Y correspond to a direction parallel to a main surface of a substrate configuring a display device DSP and the third direction Z corresponds to a thickness direction of the display device DSP. Here, as an example of the display device DSP, a liquid crystal display device equipped with a sensor SS will be described.

The display device DSP includes a display panel PNL, an IC chip I1, a wiring substrate SUB3 or the like. The display panel PNL is a liquid crystal panel, and includes a first substrate SUB1, a second substrate SUB2, a seal SE, and a liquid crystal layer LC. The second substrate SUB2 is opposed to the first substrate SUB1 in the third direction Z. The seal SE corresponds to a portion indicated diagonally upward right in FIG. 1 and adheres the first substrate SUB1 to the second substrate SUB2. The liquid crystal layer LC is disposed between the first substrate SUB1 and the second substrate SUB2 at an inner side of the seal SE.

In the following description, a direction from the first substrate SUB1 toward the second substrate SUB2 is referred to as an upward direction and a direction from the second substrate SUB2 toward the first substrate SUB1 is referred to as a downward direction. In addition, what is viewed from the second substrate SUB2 toward the first substrate SUB1 is referred to as a plan view.

The display panel PNL includes a display area DA that displays an image and a frame-like non-display area NDA surrounding the display area DA. The display area DA is an example of a first area and is located inside an area surrounded by the seal SE. The non-display area NDA is an example of a second area and is adjacent to the display area DA. The seal SE is located in the non-display area NDA.

The wiring substrate SUB3 is mounted on the first substrate SUB1. The wiring substrate SUB3 is, for example, a flexible substrate having flexibility. It should be noted that the flexible substrate applicable in the present embodiment may include a flexible portion formed of a bendable material formed in at least a part thereof. In other words, the wiring substrate SUB3 may be a flexible substrate the whole of which is configured as a flexible portion, and may be a rigid flexible substrate including a rigid portion formed of hard materials such as glass epoxy and a flexible portion formed of bendable materials such as polyimide.

The IC chip I1 is mounted over the wiring substrate SUB3. The IC chip I1 is not limited to the example illustrated in FIG. 1, but the IC chip I1 may be mounted over the first substrate SUB1 extending outwardly of the second substrate SUB2, or may be mounted over an external circuit board connected to the wiring substrate SUB3. The IC chip I1 includes, for example, a display driver DD that outputs a signal necessary for displaying an image. The display driver DD includes, for example, at least one of a signal line drive circuit SD, a scanning line drive circuit GD, and a common electrode drive circuit CD which will be described below. In addition, in the example illustrated in FIG. 1, the IC chip I1 includes a detection circuit RC that serves as a touch panel controller or the like. The detection circuit RC may be built in another IC chip different from the IC chip I1.

The display panel PNL may be, for example, a transmissive type having a transmissive display function of selectively transmitting light from a lower side of the first substrate SUB1 to display an image, or may be a reflective type having a reflective display function of selectively reflecting light from an upper side of the second substrate SUB2 to display an image. Alternatively, the display panel PNL may be a transflective type having the transmissive display function and the reflective display function.

The sensor SS performs sensing for detecting a contact or approach of an object to the display device DSP. The sensor SS is provided with a plurality of detection electrodes Rx (Rx1, Rx2, Rx3, Rx4, . . . ). The detection electrode Rx is provided on the second substrate SUB2. Each detection electrode Rx extends in the first direction X and is arranged at intervals in the second direction Y. The detection electrode Rx includes a detector RS and a connector CN. In addition, each detection electrode Rx has a terminal RT (RT1, RT2, RT3, RT4, . . . ).

The detector RS is located in the display area DA and extends in the first direction X. In the detection electrode Rx, the detector RS is mainly used for sensing. As an example, the detector RS can be formed into a stripe shape by an aggregate of fine metal wires. In addition, in the example illustrated in FIG. 1, one detection electrode Rx includes two detectors RS, but three or more detectors RS may be provided, or one detector RS may be provided.

The terminal RT is located on one end side of the non-display area NDA along the first direction X and is connected to the detector RS. The connector CN is located on one end side and the other end side of the non-display area NDA along the first direction X, and connects the plurality of detectors RS to each other, and at the same time, is connected to the terminal RT. In FIG. 1, one end side corresponds to a left side of the display area DA and the other end side corresponds to a right side of the display area DA. A part of the terminal RT is formed at a location overlaying the seal SE in planar view.

The first substrate SUB1 includes pads P (P1, P2, P3, P4, . . . ) and wiring lines W (W1, W2, W3, W4, . . . ). The pad P and the wiring line W are located at one end side or the other end side of the non-display area NDA and overlay the seal SE in planar view. The pad P is formed at a location overlaying the terminal RT in planar view. The wiring line W is connected to the pad P, extends along the second direction Y, and is electrically connected to the detection circuit RC of the IC chip I1 via the wiring substrate SUB3.

The contact hole V (V1, V2, V3, V4, . . . ) is formed at a location where the terminal RT and the pad P are opposed to each other. In addition, the contact hole V may penetrate through the pad P, simultaneously with penetrating the second substrate SUB2 including the terminal RT and the seal SE. In the example illustrated in FIG. 1, the contact hole V has a circular shape in planar view, but it is not limited thereto, and may have other shapes such as an ellipse. The terminal RT is formed slightly larger than the contact hole V. In the example illustrated in FIG. 1, the terminal RT has a circular shape, but it is not limited thereto, and may have other shapes such as an octagon.

The contact hole V is provided with a connecting material C to be described below, and the terminal RT of the detection electrode Rx and the pad P are electrically connected to each other via the connecting material C. The detection electrode Rx is an example of the second conductive layer L2 provided on the second substrate SUB2 that is spaced apart from the first substrate SUB1, and the pad P and the wiring line W are an example of the first conductive layer L1 provided on the first substrate SUB1.

The detection electrode Rx connected to the pad P is electrically connected to the detection circuit RC via the wiring substrate SUB3 connected to the first substrate SUB1. The detection circuit RC reads a sensor signal output from the detection electrode Rx and detects the presence or absence of the contact or approach of the object, the location coordinate of the object or the like.

In the example illustrated in FIG. 1, all of the terminal RT (RT1, RT3, . . . ), the pad P (P1, P3, . . . ), the wiring line W (W1, W3, . . . ), and the contact hole V (V1, V3, . . . ) of each of the odd-numbered detection electrodes Rx (Rx1, Rx3, . . . ) are located on one end side of the non-display area NDA. In contrast, all of the terminal RT (RT2, RT4, . . . ), the pad P (P2, P4, . . . ), the wiring line W (W2, W4, . . . ), and the contact hole V (V2, V4, . . . ) of each of the even-numbered detection electrodes Rx (Rx2, Rx4, . . . ) are located on the other end side opposite to the one end side of the non-display area NDA. According to the layout, a width of the one end side and a width of the other end side in the non-display area NDA can be uniform, which is suitable for narrowing the frame.

As illustrated in FIG. 1, in the layout in which the pad P3 is closer to the wiring substrate SUB3 than the pad P1, the wiring line W1 bypasses an inner side of the pad P3, that is, a side close to the display area DA, and are disposed in parallel inside the wiring line W3 between the pad P3 and the wiring substrate SUB3. Likewise, the wiring line W2 bypasses an inner side of the pad P4 and is disposed in parallel inside the wiring line W4 between the pad P4 and the wiring substrate SUB3.

FIG. 2 is a plan view schematically illustrating a basic configuration and an equivalent circuit of the display panel PNL illustrated in FIG. 1.

The display panel PNL includes a plurality of pixels PX in the display area DA. Here, a pixel indicates a minimum unit that can be individually controlled according to a pixel signal, and exists in, for example, a region including a switching element disposed at a location where a scanning line and a signal line to be described below intersect each other. The pixels PX are arrayed in a matrix in the first direction X and the second direction Y. In addition, the display panel PNL includes a plurality of scanning lines G (G1 to Gn), a plurality of signal lines S (S1 to Sm), a common electrode CE or the like in the display area DA.

Each scanning line G extends in the first direction X and is arranged in the second direction Y. Each signal line S extends in the second direction Y and is arranged in the first direction X. It should be noted that the scanning line G and the signal line S may not necessarily extend linearly, and a part thereof may be bent. The common electrode CE is arranged over the pixels PX.

The scanning line G, the signal line S, and the common electrode CE are each led out to the non-display area NDA. In the non-display area NDA, the scanning line G is connected to the scanning line drive circuit GD, the signal line S is connected to the signal line drive circuit SD, and the common electrode CE is connected to the common electrode drive circuit CD. The signal line drive circuit SD, the scanning line drive circuit GD, and the common electrode drive circuit CD may be formed on the first substrate SUB1, and a part or all of them are built in the IC chip I1 illustrated in FIG. 1

Each pixel PX includes a switching element SW, a pixel electrode PE, a common electrode CE, a liquid crystal layer LC or the like. The switching element SW is formed of, for example, a thin film transistor (TFT) and is electrically connected to the scanning line G and the signal line S. More specifically, the switching element SW includes a gate electrode WG, a source electrode WS, and a drain electrode WD. The gate electrode WG is electrically connected to the scanning line G. In the example illustrated in FIG. 2, the electrode electrically connected to the signal line S is the source electrode WS, and the electrode electrically connected to the pixel electrode PE is the drain electrode WD.

The scanning line G is connected to the switching element SW in each of the pixels PX arranged in the first direction X. The signal line S is connected to the switching element SW in each of the pixels PX arranged in the second direction Y. Each of the pixel electrodes PE is opposed to the common electrode CE and drives the liquid crystal layer LC by an electric field generated between the pixel electrode PE and the common electrode CE. A storage capacitor CS is formed, for example, between the common electrode CE and the pixel electrode PE.

FIG. 3 is a cross-sectional view of the display device DSP taken along the first direction X in the display area DA. In the example illustrated in FIG. 3, the display panel PNL mainly has a configuration corresponding to a display mode using a horizontal electric field substantially parallel to an X-Y plane. It should be noted that the display panel PNL may have a configuration corresponding to a vertical electric field perpendicular to the X-Y plane, an inclined electric field to the X-Y plane, or a display mode that uses a combination of the electric fields.

In the display mode using the horizontal electric field, for example, a configuration in which either the first substrate SUB1 or the second substrate SUB2 is provided with both of the pixel electrode PE and the common electrode CE can be applied. In the display mode using the vertical electric field or the inclined electric field, for example, a configuration in which the first substrate SUB1 is provided with any one of the pixel electrode PE and the common electrode CE and the second substrate SUB2 is provided with the other of the pixel electrode PE and the common electrode CE can be applied.

The first substrate SUB1 includes the first basement 10, the signal line S, the common electrode CE, a metal layer M, the pixel electrode PE, a first insulating layer 11, a second insulating layer 12, a third insulating layer 13, a first alignment film AL1 or the like. The first basement 10 has a third main surface 10A that is opposed to the second substrate SUB2 and a fourth main surface 10B opposite to the third main surface 10A. In FIG. 3, the switching elements, the scanning lines, various insulating layers interposed therebetween or the like are omitted.

The first insulating layer 11 is located over the third main surface 10A of the first basement 10. The scanning line or a semiconductor layer of a switching element that is not shown is located between the first basement 10 and the first insulating layer 11. The signal line S is located over the first insulating layer 11. The second insulating layer 12 is located over the signal line S and the first insulating layer 11. The common electrode CE is located over the second insulating layer 12.

The metal layer M comes into contact with the common electrode CE directly above the signal line S. In the example illustrated in FIG. 3, the metal layer M is located over the common electrode CE, but it may be located between the common electrode CE and the second insulating layer 12. The third insulating layer 13 is located over the common electrode CE and the metal layer M. The pixel electrode PE is located over the third insulating layer 13. The pixel electrode PE is opposed to the common electrode CE via the third insulating layer 13. In addition, the pixel electrode PE has a slit SL at a location where the pixel electrode PE is opposed to the common electrode CE. The first alignment film AL1 covers the pixel electrode PE and the third insulating layer 13.

The scanning line G, the signal line S, and the metal layer M are formed of metal materials such as molybdenum, tungsten, titanium, and aluminum. It should be noted that the scanning line G, the signal line S, and the metal layer M may have a single layer structure or a multilayer structure. The common electrode CE and the pixel electrode PE are formed of transparent conductive materials such as indium tin oxide (ITO) or indium zinc oxide (IZO). The first insulating layer 11 and the third insulating layer 13 are inorganic insulating layers and the second insulating layer 12 is an organic insulating layer.

It should be noted that the configuration of the first substrate SUB1 is not limited to the example illustrated in FIG. 3, and the pixel electrode PE may be located between the second insulating layer 12 and the third insulating layer 13 and the common electrode CE may be located between the third insulating layer 13 and the first alignment film AL1. In such a case, the pixel electrode PE is formed in a flat plate shape without a slit, and the common electrode CE has a slit opposed to the pixel electrode PE. In addition, both the pixel electrode PE and the common electrode CE may be formed in a comb shape and may be disposed so as to be engaged with each other.

The second substrate SUB2 includes a second basement 20, a light-shielding layer BM, a color filter CF, an overcoat layer OC, a second alignment film AL2 or the like. The second basement 20 has a first main surface 20A opposed to the first substrate SUB1 and a second main surface 20B opposite to the first main surface 20A.

The light-shielding layer BM and the color filter CF are located over the first main surface 20A of the second basement 20. The light-shielding layer BM partitions each pixel and is located directly above the signal line S. The color filter CF is opposed to the pixel electrode PE, and a part thereof overlays the light-shielding layer BM. The color filter CF includes a red color filter, a green color filter, a blue color filter or the like. The overcoat layer OC covers the color filter CF. The second alignment film AL2 covers the overcoat layer OC.

It should be noted that the color filter CF may be disposed on the first substrate SUB1. The color filter CF may include color filters for four or more colors. A pixel displaying white may be provided with a white color filter, provided with an uncolored resin material, or provided with the overcoat layer OC without being provided with the color filter.

A first polarizer PL1 is located between the first basement 10 and an illumination device BL. A second polarizer PL2 is located over the detection electrode Rx that is provided over the second main surface 20B of the second basement 20. It should be noted that the first polarizer PL1 and the second polarizer PL2 may be additionally provided with a retardation film or the like, if necessary.

Figure 4:
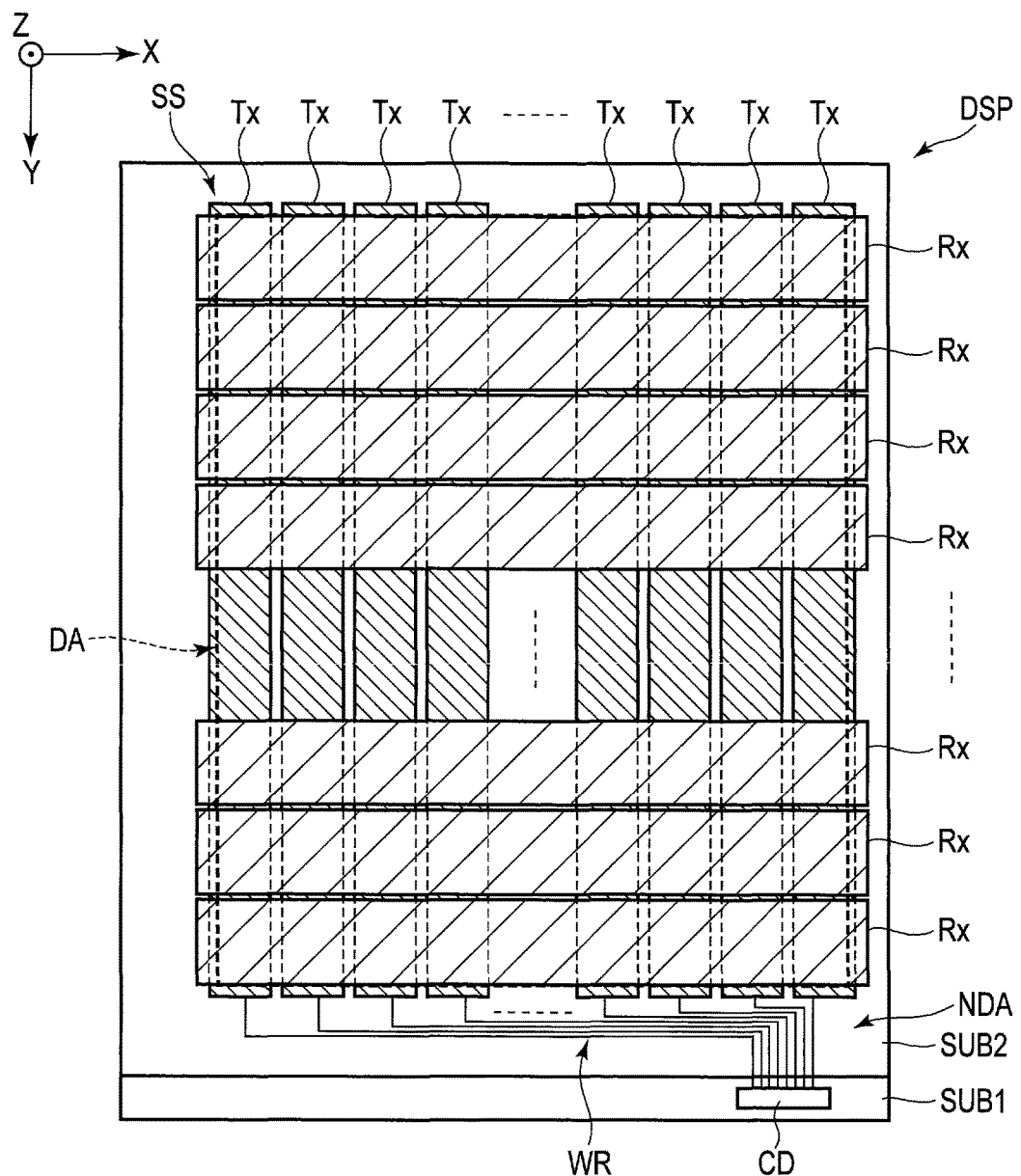
FIG. 4 is a plan view illustrating a configuration example of a sensor SS according to the first embodiment.

A configuration example of the sensor SS mounted on the display device DSP of the present embodiment will be described with reference to FIG. 4. The sensor SS illustrated in FIG. 4 is, for example, a mutual-capacitive electrostatic capacitance type, and can detect a contact or an approach of an object based on a change in electrostatic capacitance between a pair of electrodes opposed to each other via a dielectric. The sensor SS is, for example, an in-cell type touch panel.

The sensor SS includes a sensor driving electrode Tx and the detection electrode Rx. In the example illustrated in FIG. 4, the sensor driving electrode Tx corresponds to a portion indicated diagonally downward right and is provided on the first substrate SUB1. In addition, the detection electrode Rx corresponds to a portion indicated diagonally upward right and is provided on the second substrate SUB2. The sensor driving electrode Tx and the detection electrode Rx intersect with each other in the X-Y plane. The detection electrode Rx is opposed to the sensor driving electrode Tx in the third direction Z.

The sensor driving electrode Tx and the detection electrode Rx are located in the display area DA, and a part of the sensor driving electrode Tx and the detection electrode Rx extends to the non-display area NDA. In the example illustrated in FIG. 4, each of the sensor driving electrodes Tx has a stripe shape extending in the second direction Y, and the sensor driving electrodes Tx are arranged at intervals in the first direction X. Each of the detection electrodes Rx extends in the first direction X and the detection electrodes Rx are arranged at intervals in the second direction Y. The detection electrode Rx is electrically connected to the pad P by the inter-substrate conducting structure and is connected to the detection circuit RC via the wiring line W.

Each of the sensor driving electrodes Tx is electrically connected to the common electrode drive circuit CD via the wiring line W. It should be noted that the number, size and shape of the sensor driving electrodes Tx and the detection electrodes Rx are not particularly limited, and can be variously changed. The sensor driving electrode Tx includes the above-mentioned common electrode CE and serves to generate an electric field between the sensor driving electrode Tx and the pixel electrode PE and generate capacitance between the sensor driving electrode Tx and the detection electrode Rx to detect a location of an object.

The common electrode drive circuit CD supplies a common drive signal to the sensor driving electrode Tx including the common electrode CE during display driving for displaying an image in the display area DA. In addition, the common electrode drive circuit CD supplies a sensor drive signal to the sensor driving electrode Tx during sensing driving for sensing. As the sensor drive signal is supplied to the sensor driving electrode Tx, the detection electrode Rx outputs a sensor signal necessary for sensing, in other words, a signal based on a change in inter-electrode capacitance between the sensor driving electrode Tx and the detection electrode Rx. The detection signal output from the detection electrode Rx is input to the detection circuit RC illustrated in FIG. 1.

It should be noted that the sensor SS is not limited to the mutual capacitive type of detecting an object based on the electrostatic capacitance between the pair of electrodes, that is, the change in the electrostatic capacitance between the sensor driving electrode Tx and the detection electrode Rx, and may be a self-capacitive type that detects an object based on a change in capacitance of the detection electrode Rx itself.

Next, the above-mentioned contact hole V (V1, V2, V3, V4, . . . ) will be described. FIG. 5 is a schematic cross-sectional view of the display device DSP taken along the line F5-F5 in FIG. 1.

In the example illustrated in FIG. 5, in the inter-substrate conducting structure provided in the non-display area NDA, the display device DSP includes the first substrate SUB1, the second substrate SUB2, an organic insulating layer OI, a protective film PF, the connecting material C, the first polarizer PL1, and the second polarizer PL2. The first polarizer PL1 adheres to the first substrate SUB1 by an adhesive layer AD1. The second polarizer PL2 adheres to the second substrate SUB2 by an adhesive layer AD2.

The first substrate SUB1 includes the above-mentioned first basement 10 and the first conductive layer L1. The first conductive layer L1 includes the pad P (P1, P2, P3, P4, . . . ) or the wiring line W (W1, W2, W3, W4, . . . ) that are described above and is located over the third main surface 10A side opposed to the second substrate SUB2. The first insulating layer 11 illustrated in FIG. 3, another insulating layer, or another conductive layer may be disposed between the first basement 10 and the pad P and between the first basement 10 and the second insulating layer 12.

The second substrate SUB2 includes the second basement 20 and the second conductive layer L2 described above. The first main surface 20A of the second basement 20 is opposed to the first conductive layer L1 and is spaced apart from the first conductive layer L1 in the third direction Z. The second conductive layer L2 includes the above-mentioned detection electrode Rx, that is, the terminal RT (RT1, RT2, RT3, RT4, . . . ) or the connector CN. The second conductive layer L2 is located over the second main surface 20B side and is covered with the protective film PF. In other words, the first basement 10, the first conductive layer L1, the second basement 20, the second conductive layer L2, and the protective film PF are arranged in the third direction Z in this order.

The organic insulating layer OI is located between the first conductive layer L1 and the second basement 20. Instead of the organic insulating layer OI, an inorganic insulating layer or another conductive layer may be located, or an air layer may be located. It should be noted that various insulating layers and various conductive layers may be disposed between the second basement 20 and the second conductive layer L2 or over the second conductive layer L2.

For example, the organic insulating layer OI includes the seal SE for bonding the first substrate SUB1 and the second substrate SUB2, the second insulating layer 12 of the first substrate SUB1, the light-shielding layer BM and the overcoat layer OC of the second substrate SUB2, or the like. The seal SE is located between the second insulating layer 12 and the overcoat layer OC. The liquid crystal layer LC is located in a gap between the first substrate SUB1 and the second substrate SUB2 and is surrounded by the seal SE.

It should be noted that the metal layer M, the third insulating layer 13, and the first alignment film AL1 illustrated in FIG. 3 may be interposed between the second insulating layer 12 and the seal SE. The second alignment film AL2 illustrated in FIG. 3 may be interposed between the overcoat layer OC and the seal SE.

The material of the first and second basements 10 and 20 is, for example, glass, or more specifically, alkali-free glass. Note that the material may be a flexible resin such as polyimide. The protective film PF is formed of, for example, organic insulating materials such as an acrylic resin. The first and second conductive layers L1 and L2 are formed of, for example, metal materials such as molybdenum, tungsten, titanium, aluminum, silver, copper, and chromium, an alloy in which these metal materials are combined, or transparent conductive materials such as ITO or IZO. The first and second conductive layers L1 and L2 may also have a single layer structure or a multilayer structure.

As illustrated in FIG. 5, the second basement 20 has a first hole VA penetrating from the second main surface 20B to the first main surface 20A. The second conductive layer L2 has a second hole VB that penetrates the second conductive layer L2 and is formed to be slightly larger than the first hole VA. The protective film PF has a third hole VC that penetrates the protective film PF and formed to be slightly larger than the first and second holes VA and VB.

In addition to the first to third holes VA, VB, and VC, the display device DSP has a fourth hole VD penetrating the first conductive layer L1, a fifth hole VE penetrating each organic insulating layer OI, and a concavity CC formed in the first basement 10. The first to fifth holes VA, VB, VC, VD, and VE and the concavity CC communicate with each other and configure the above-mentioned contact hole V.

The fourth hole VD penetrates the first conductive layer L1 at the pad P and is opposed to the first hole VA in the third direction Z. In the example illustrated in FIG. 5, the fifth hole VE includes a hole penetrating the second insulating layer 12, a hole penetrating the seal SE, a hole penetrating a light-shielding layer BM and the overcoat layer OC or the like.

The fifth hole VE is extended in the second direction Y as compared with the first and fourth holes VA and VD. It should be noted that the fifth hole VE extends beyond the first and fourth holes VA and VD over all directions on the X-Y plane as well as in the second direction Y. In addition, an inner surface LS1 of the first conductive layer L1 is formed to be approximately flush with an edge of the concavity CC of the first basement 10. For this reason, the first conductive layer L1 has an upper surface LT1 that is not covered with the organic insulating layer OI in the vicinity of the fourth hole VD.

The concavity CC is formed from the third main surface 10A toward the fourth main surface 10B of the first basement 10 and does not penetrate up to the fourth main surface 10B. The concavity CC is opposed to the third hole VC in the third direction Z. In one example, the depth of the concavity CC along the third direction Z is about ⅕ to about ½ of a thickness of the first basement 10 in the third direction Z.

All of the fourth and fifth holes VD and VE and the concavity CC are located directly under the first to third holes VA, VB, and VC, and the third hole VC, the second hole VB, the first hole VA, the fifth hole VE, the fourth hole VD, and the concavity CC are arranged in the third direction Z in order. The contact hole V can be formed by irradiating laser light or etching from above the second substrate SUB2. Various organic insulating layers OI on which the fourth hole VD is provided are formed from, for example, materials having a melting point lower than that of the second basement 20 on which the first hole VA is provided and the first conductive layer L1 on which the third hole VC is provided. Alternatively, various organic insulating layers OI are formed from materials that are easily etched.

As illustrated in FIG. 5, the connecting material C is disposed in the contact hole V. For example, it is preferable that the connecting material C contains metal materials such as silver, and the metal material includes fine particles having a particle diameter of the order of several nanometers to several tens of nanometers. The connecting material C electrically connects the first conductive layer L1 and the second conductive layer L2 via the contact hole V. In the example illustrated in FIG. 5, the connecting material C comes into contact with an inner circumferential surface LS2, an upper surface LT2, and an outer circumferential surface LU2 of the terminal RT in the second conductive layer L2, respectively, and comes into contact with an inner surface LS1 and an upper surface LT1 of the pad P in the first conductive layer L1, respectively.

In the example illustrated in FIG. 5, the connecting material C is provided on the inner surfaces of the first to fifth holes VA, VB, VC, VD, and VE and the concavity CC, respectively, but the connecting material C is not filled in the vicinity of centers thereof. For this reason, the connecting material C has a hollow. The connecting material C having the shape is formed by injecting the connecting material C into the contact hole V under a barometric pressure or under the environment of atmospheric pressure lower than the barometric pressure and removing a solvent contained in the connecting material C.

The hollow of the connecting material C is filled up with a filling material FI. The filling material FI is formed of, for example, the same material as the protective film PF. It should be noted that the connecting material C may be formed so as not to have the hollow.

The connecting material C is continuously formed between the first conductive layer L1 and the second conductive layer L2 without being interrupted. By doing so, the second conductive layer L2 is electrically connected to the above-mentioned wiring substrate SUB3 via the connecting material C and the first conductive layer L1. For this reason, a control circuit that writes a signal into the second conductive layer L2 or reads a signal output from the second conductive layer L2 can be connected to the second conductive layer L2 via the wiring substrate SUB3. Therefore, in order to connect the second conductive layer L2 and the control circuit, there is no need to separately provide a wiring substrate for the second substrate SUB2.

Here, main materials usable for the first and second basements 10 and 20 or the first and second conductive layers L1, L2 and their melting points are illustrated in FIG. 6.

In FIG. 6, as the metal materials, indium, aluminum, titanium, niobium, molybdenum, and tungsten are exemplified. In addition, as the glass material, silicon and quartz glass are exemplified.

It is preferable that a difference between the melting point of the material of the pad P of the first conductive layer L1 on which the contact hole V is formed and the melting point of the material of the first basement 10 is within 300° C., for example. An example of the pad P may include a metal film containing titanium.

If the melting point of the material of the pad P is higher than that of the material of the first basement 10 by more than 300° C., the first basement 10 is excessively heated by a laser light for melting the pad P1, such that the molten first basement 10 is scattered into the contact hole V. Since the first basement 10 has a large electric resistance, conduction is hindered at a location to which the scattered material is attached.

In contrast, if the melting point of the material of the pad P is lower than that of the material of the first basement 10 by more than 300° C., the pad P is excessively heated by the laser light for melting the first basement 10 to be greatly lost. If the pad P becomes smaller, a contact area between the pad P and the connecting material C becomes smaller, such that connection reliability between the pad P and the connecting material C becomes lower.

For the same reasons, it is preferable that even a difference between a melting point of the material of the terminal RT of the second conductive layer L2 in which the contact hole V is formed and a melting point of the material of the second basement 20 is within 300° C.

Figure 8:
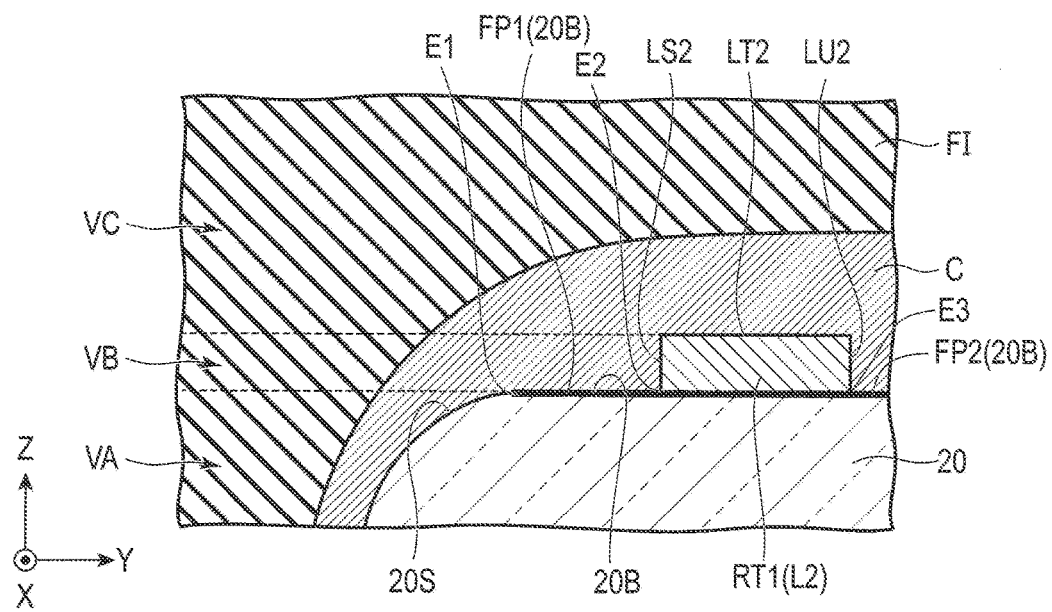
FIG. 8 is an enlarged cross-sectional view of a second hole VB illustrated in FIG. 5.

FIG. 7 is a plan view of the contact hole V viewed from the second substrate SUB2 side. FIG. 8 is an enlarged cross-sectional view of the second hole VB illustrated in FIG. 5. As illustrated in FIGS. 7 and 8, the second main surface 20B of the second basement 20 has a first flat portion FP1 exposed from the second conductive layer L2 between an edge E1 of the first hole VA opened to the second basement 20 and an edge E2 of the second hole VB opened to the detection electrode Rx. In the example illustrated in FIG. 8, an inner surface 20S of the first hole VA has a curved shape in the vicinity of a boundary between the first hole VA and the second hole VB. For example, the edge E1 of the first hole VA corresponds to a boundary between the curved inner surface 20S and the second main surface 20B in parallel with the X-Y plane.

If the second main surface 20B has a mortar-shaped cavity and the first hole VA is formed at a bottom of the cavity, if the second main surface 20B has a protrusion rising to surround the first hole VA or the like, even the case where a part of the second main surface 20B in the vicinity of the first hole VA is not necessarily parallel to the X-Y plane may be considered. However, in even the case where the second main surface 20B is not flat in the vicinity of the first hole VA, the second main surface 20B (for example, first flat portion FP1) of the second basement 20 remains inside the second hole VB opened to the second conductive layer L2. For this reason, the first flat portion FP1 of the second main surface 20B exposed from the second hole VB may be referred to as a main surface remaining portion FP1.

If the second main surface 20B is parallel to the X-Y plane, the edge E1 of the first hole VA can also be regarded as a starting point at which an angle of the second basement 20 cut on the Y-Z plane changes. The edge E2 of the second hole VB can also be regarded as a starting point at which the angle of the second conductive layer L2 cut on the Y-Z plane changes. Even in the case, a diameter of the second hole VB is larger than that of the first hole VA. In other words, the edge E2 of the second hole VB is located outside the edge E1 of the first hole VA in a radial direction. In addition, if the second main surface 20B is parallel to the X-Y plane, the first flat portion FP1 can be said to be a region parallel to the X-Y plane.

Furthermore, the second main surface 20B has a second flat portion FP2 exposed from the detection electrode Rx between the outer edge E3 of the terminal RT of the detection electrode Rx and the edge E4 of the third hole VC opened to the protective film PF. A difference in level G (illustrated in FIG. 13) is formed between the second flat portion FP2 where the second main surface 20B is exposed and an upper surface of the protective film PF.

In the example illustrated in FIG. 7, the first to third holes VA, VB, and VC are arranged so that their central axes coincide with each other. The first flat portion FP1 is formed in an annular shape surrounding the first hole VA. The second flat portion FP2 is formed in an annular shape surrounding the first hole VA except for a portion where the connector CN of the detection electrode Rx is disposed. In the example illustrated in FIG. 7, widths of the first and second flat portions FP1 and FP2 are constant. It should be noted that the widths of the first and second flat portions FP1 and FP2 do not need to be constant over the entire circumference and may be partially different.

Next, an example of a method for manufacturing a display device DSP will be described with reference to FIGS. 9 to 18.

Figure 9:
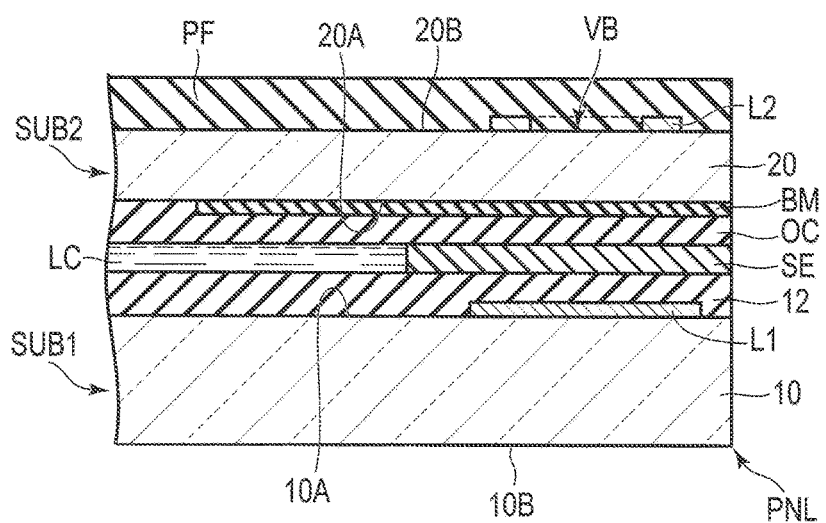
FIG. 9 is a cross-sectional view for describing a method for manufacturing a display device DSP of the first embodiment.

First, as illustrated in FIG. 9, a display panel PNL is prepared. The display panel PNL illustrated in FIG. 9 includes the first substrate SUB1 including at least the first basement 10 and the first conductive layer L1 and the second substrate SUB2 including at least the second basement 20 and the second conductive layer L2. In the display panel PNL, the first substrate SUB1 and the second substrate SUB2 adhere to each other by the seal SE in the state where the second basement 20 is opposed to the first conductive layer L1 and the second basement 20 is spaced apart from the first conductive layer L1. The second conductive layer L2 is provided with the second hole VB in advance and the surface thereof is covered with the protective film PF.

Describing an example of the method for manufacturing a display panel PNL, the first substrate SUB1 having the first conductive layer L1 or the second insulating layer 12 or the like formed over the third main surface 10A of the first basement 10 is prepared. The second substrate SUB2 having the light-shielding layer BM, the overcoat layer OC or the like formed over the first main surface 20A of the second basement 20 is prepared.

At this point, the second conductive layer L2 is not formed over the second main surface 20B of the second substrate SUB2. A loop-shaped seal SE is formed on any one of the first substrate SUB1 and the second substrate SUB2, and a liquid crystal material drops into the seal SE. Thereafter, the first substrate SUB1 and the second substrate SUB2 are bonded to each other, and the seal SE is cured so that the first substrate SUB1 adheres to the second substrate SUB2.

Thereafter, the first basement 10 and the second basement 20 are each etched with an etchant such as hydrofluoric acid (HF) to make the first basement 10 and the second basement 20 thin. Thereafter, the second conductive layer L2 is formed over the second main surface 20B of the second basement 20. At this point, the second hole VB can be patterned at the same time. Note that the second conductive layer L2 may be formed first, and then the second hole VB may be formed. By doing so, the display panel PNL illustrated in FIG. 9 is manufactured.

Another example of the method for manufacturing a display panel PNL will be described. That is, similarly to the above example, while the first substrate SUB1 is prepared, the light-shielding layer BM, the overcoat layer OC or the like are formed over the first main surface 20A of the second basement 20 and the second substrate SUB2 on which the second conductive layer L2 having the second hole VB patterned over the second main surface 20B of the second basement 20 is formed is prepared. Thereafter, the seal SE is formed, the liquid crystal material drops, and then the first substrate SUB1 and the second substrate SUB2 adhere to each other. By doing so, the display panel PNL illustrated in FIG. 9 is manufactured.

Subsequently, as illustrated in FIG. 10, the second substrate SUB2 is irradiated with first laser light LSR1. In the example illustrated in FIG. 10, the first laser light LSR1 is irradiated from above the second conductive layer L2. As a laser light source, for example, a carbon dioxide gas laser device or the like can be applied, but any device that can perform a drilling process on a glass material and an organic material can be used, and an excimer laser device or the like can also be applied.

As illustrated in FIG. 11, the protective film PF is removed by irradiating the first laser light LSR1 to form the third hole VC. In the third hole VC, the second main surface 20B of the second basement 20 is exposed from the previously formed second hole VB. The first laser light LSR1 is laser light having intensity at which the second conductive layer L2 and the second basement 20 are not melted. Therefore, the second conductive layer L2 and the second basement 20 are not damaged even when irradiated with the first laser light LSR1.

Further, as illustrated in FIG. 12, the second basement 20 is irradiated with second laser light LSR2 via the second hole VB. The second laser light LSR2 has a smaller diameter than the first laser light LSR1. In addition, the second laser light LSR2 is laser light having intensity at which the first and second basements 10 and 20 and the first conductive layer L1 can be melted or sublimed. For example, if an optical axis of the first laser light LSR1 coincides with that of the second laser light LSR2, the laser light can be irradiated continuously without moving the laser light source. Since the second laser light LSR2 is irradiated to the second hole VB that is an area where the second conductive layer L2 is not formed, the second conductive layer L2 is not damaged. That is, it is understood that the second laser light LSR2 is higher in intensity than the first laser light LSR1.

As illustrated in FIG. 13, the first hole VA penetrating the second basement 20 is formed by the second laser light LSR2. In addition, in the example illustrated in FIG. 13, when the first laser light LSR1 is irradiated, the fifth hole VE penetrating the organic insulating layer OI (light-shielding layer BM, overcoat layer OC, seal SE, second insulating layer 12 or the like), the fourth hole VD penetrating the first conductive layer L1, and the concavity CC of the first basement 10 are also formed at the same time. By doing so, the contact hole V for connecting the first conductive layer L1 and the second conductive layer L2 is formed.

The difference between the melting point of the material of the first conductive layer L1 and the melting point of the material of the first basement 10 is within 300° C., and the fourth hole VD of the first conductive layer L1 and the concavity CC of the first basement 10 are formed substantially at the same time. As a result, the inner surface LS1 of the fourth hole VD and the edge of the concavity CC are formed to be approximately flush with each other.

Figure 14:
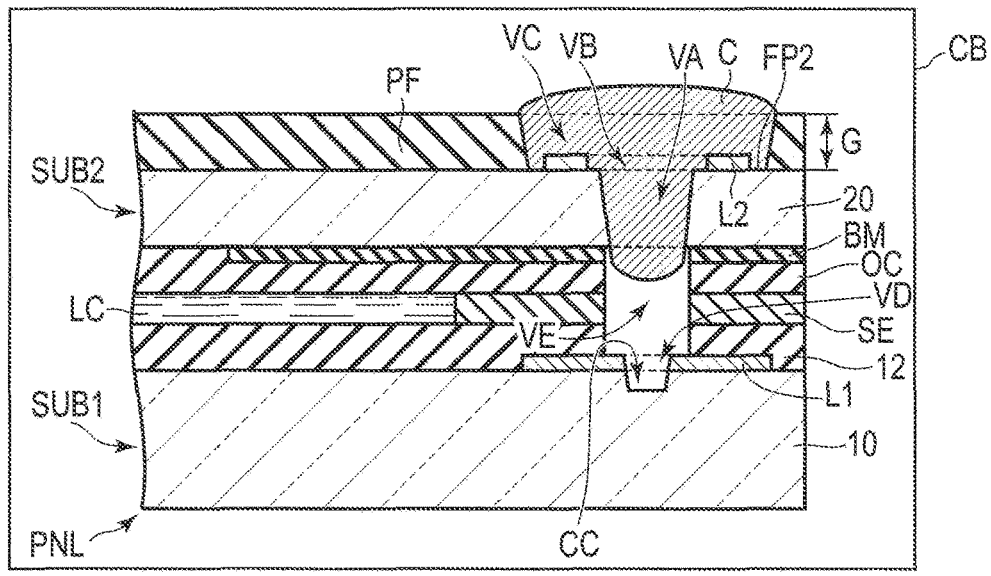
FIG. 14 is a cross-sectional view for describing the method for manufacturing a display device DSP subsequent to FIG. 13.

Subsequently, the connecting material C for electrically connecting the first conductive layer L1 and the second conductive layer L2 is formed. First, as illustrated in FIG. 14, after the display panel PNL is provided inside a chamber CB, air inside the chamber CB is discharged to inject the connecting material C into the contact hole V under vacuum (under the environment in which a pressure is lower than the barometric pressure), for example. An injection device may be an ink jet or a dispenser.

At this point, the difference in level G is formed between the second flat portion FP2 and the protective film PF. Even if the connecting material C is injected in an amount greatly exceeding the thickness of the second conductive layer L2, the protective film PF having the difference in level G serves as a levee to prevent the connecting material C from being leaked. As a result, the injected connecting material C can come into contact with not only the inner circumferential surface LS2 and the upper surface LT2 of the second conductive layer L2 but also the outer circumferential surface LU2 thereof in a wrap around manner.

Figure 15:
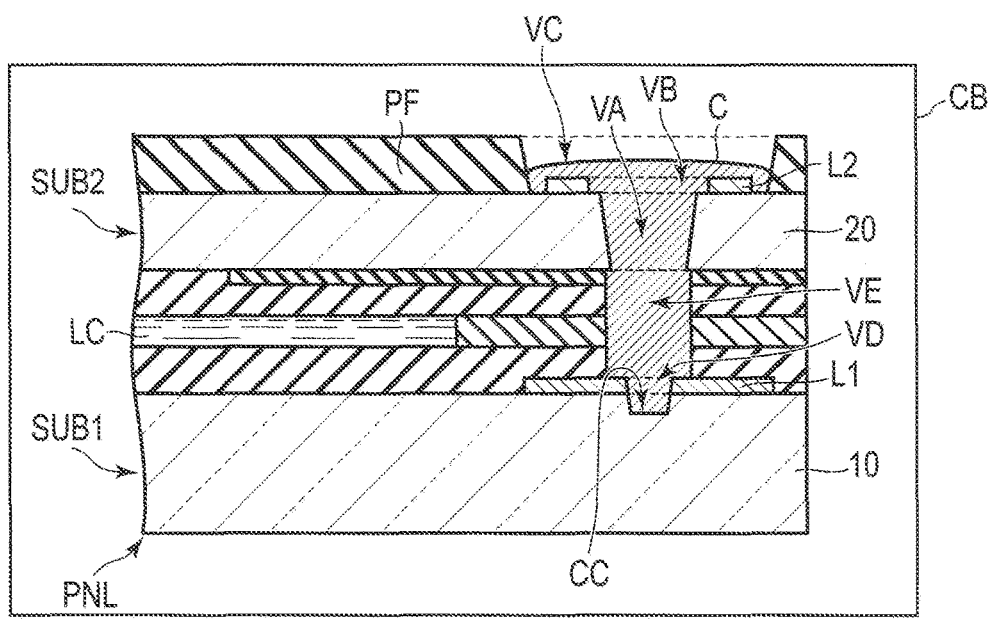
FIG. 15 is a cross-sectional view for describing the method for manufacturing a display device DSP subsequent to FIG. 14.

It should be noted that the injected connecting material C may not flow to the first conductive layer L1 and an internal space may be formed between the connecting material C and the first conductive layer L1. However, the internal space of the contact hole V becomes vacuum. For this reason, if gases such as air or inert gas are introduced into the chamber CB to reduce a degree of vacuum, as illustrated in FIG. 15, the connecting material C flows from the first hole VA into the fourth and fifth holes VD and VE and the concavity CC due to a difference in pressure around the internal space and the display panel PNL. By doing so, the connecting material C comes into contact with the first conductive layer L1.

Thereafter, as illustrated in FIG. 16, a solvent contained in the connecting material C is removed, such that a volume of the connecting material C is reduced. The connecting material C thus formed comes into contact with the second basement 20 in the first hole VA, comes into contact with the second conductive layer L2 in the second hole VB, comes into contact with the light-shielding layer BM, the overcoat layer OC, the seal SE, and the second insulating layer 12, respectively, in the fifth hole VE, comes into contact with the first conductive layer L1 in the fourth hole VD, and comes into contact with the first basement 10 in the concavity CC.

It should be noted that the method for forming a connecting material C described with reference to FIGS. 15 and 16 is merely an example and is not limited thereto. For example, even in the method for removing a solvent contained in the connecting material C after injecting the connecting material C into the fourth and fifth holes VD and VE and the concavity CC from the first hole VA under the barometric pressure, the connecting material C as described above may be formed.

Subsequently, as illustrated in FIG. 17, the filling material FI is filled in the hollow. The filling material FI is formed of, for example, the same material as the protective film PF. In the example illustrated in FIG. 17, the filling material FI is filled in the hollow of the connecting material C, and at the same time, covers the second conductive layer L2 and the connecting material C. By doing so, the surface of the second substrate SUB2 is substantially planarized, and the difference in level of the portion overlaying the contact hole V can be alleviated.

Figure 18:
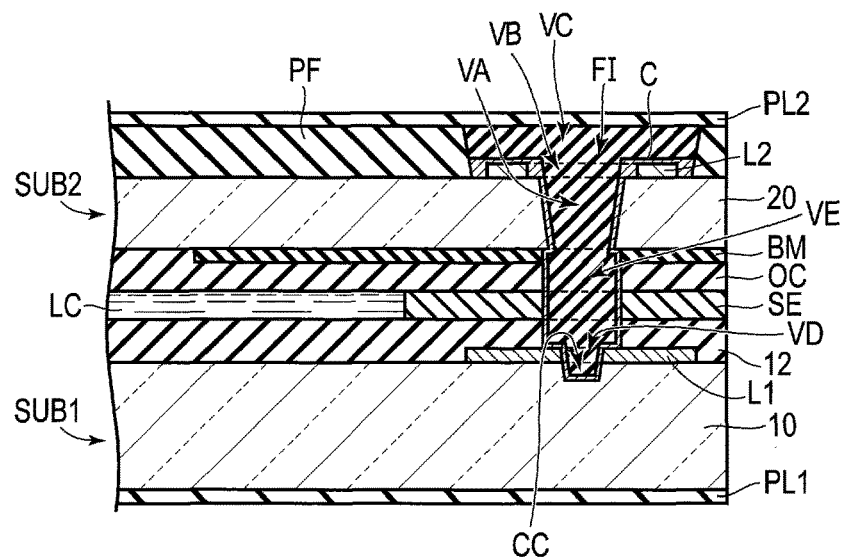
FIG. 18 is a cross-sectional view for describing the method for manufacturing a display device DSP subsequent to FIG. 17.

Subsequently, as illustrated in FIG. 18, the first polarizer PL1 adheres to the first basement 10 and the second polarizer PL2 adheres to the protective film PF. It should be noted that although the adhesive layers AD1 and AD2 are interposed between the first polarizer PL1 and the first basement 10 and between the second polarizer PL2 and the protective film PF, the illustration thereof is omitted here.

In the example illustrated in FIG. 18, the second polarizer PL2 also extends to the portion overlaying the contact hole V. Since the difference in level caused by the contact hole V is alleviated by the protective film PF, it is possible to suppress the second polarizer PL2 from being peeled due to a difference in level of a base portion of the second polarizer PL2 at the time of the adhesion of the second polarizer PL2.

According to the display device DSP described above, the detection electrode Rx provided on the second substrate SUB2 is connected to the pad P provided on the first substrate SUB1 by the connecting material C provided in the contact hole V. For this reason, there is no need to mount the wiring substrate for connecting the detection electrode Rx and the detection circuit RC on the second substrate SUB2. In other words, the wiring substrate SUB3 mounted on the first substrate SUB1 forms a transmission path for transmitting a signal necessary for displaying an image on the display panel PNL, and at the same time, forms a transmission path for transmitting a signal between the detection electrode Rx and the detection circuit RC.

Therefore, the number of wiring substrates can be reduced and the cost can be reduced, as compared with the configuration example requiring a separate wiring substrate in addition to the wiring substrate SUB3. In addition, since a space for connecting the wiring substrate to the second substrate SUB2 is unnecessary, a width of a non-display area of the display panel PNL, in particular, a width of a side edge on which the wiring substrate SUB3 is mounted can be reduced. This makes it possible to narrow the frame and reduce the cost.

Alternatively, since the connecting material C comes into contact with not only the inner circumferential surface LS2 of the second conductive layer L2 in the second hole VB but also the upper surface LT2 of the second conductive layer L2, the contact area between the connecting material C and the second conductive layer L2 may be expanded, and the poor connection between the connecting material C and the second conductive layer L2 can be suppressed.

In addition, since the connecting material C comes into contact with not only the inner surface LS1 of the first conductive layer L1 in the fourth hole VD but also the upper surface LT1 of the first conductive layer L1, the contact area between the connecting material C and the first conductive layer L1 may be expanded, and the poor connection between the connecting material C and the first conductive layer L1 can be suppressed.

In addition, it is possible to alleviate the difference in level in the third direction Z due to the formation of the hollow in the connecting material C by filling the hollow of the connecting material C with the filling material FI. In addition, since the protective film PF covers the connecting material C and the second conductive layer L2, the protective film PF can protect the connecting material C and the second conductive layer L2.

In the present embodiment, the second main surface 20B has a first flat portion FP1 between the edge E1 of the first hole VA and the edge E2 of the second hole VB. At least a part of the first flat portion FP1 and the first hole VA penetrating the second basement 20 are formed inside the second hole VB.

The second conductive layer L2 and the second basement 20 have different expansion and contraction due to a change in temperature. However, according to the present embodiment, the second laser light LSR2 for forming the first hole VA is irradiated and even if the second basement 20 is expanded or contracted due to heat, the location to which the second laser light LSR2 is irradiated is provided with the second hole VB and is not covered with the second conductive layer L2. Therefore, a load applied to the second basement 20 can be suppressed to the minimum to form the first hole VA.

Furthermore, according to the present embodiment, it is possible to prevent the poor conduction between the connecting material C and the second conductive layer L2 in advance.

The case where there is no second hole VB and the first hole VA penetrating the second conductive layer L2 and the second basement 20 is formed can be considered. At this point, if the material of the second conductive layer L2 has the melting point higher than that of the material of the second basement 20, it is conceivable that the second basement 20 is excessively heated and scattered. If the scattered material of the second basement 20 adheres to the upper surface LT2 of the second conductive layer L2, the conduction is hindered and therefore the connection reliability between the connecting material C and the second conductive layer L2 may be reduced. In contrast, if the second hole VB of the second conductive layer L2 and the first hole VA of the second basement 20 are separately formed as in the present embodiment, it is possible to prevent the second basement 20 from being scattered.

The display device DSP has the second flat portion FP2 outside the second conductive layer L2. Due to the difference in level G between the second flat portion FP2 and the protective film PF, the protective film PF serves as a levee at the time of filling the connecting material C. Since even the outer circumferential surface LU2 of the second conductive layer L2 is filled with the connecting material C in a wrap around manner, according to the present embodiment, it is possible to increase the contact area between the second conductive layer L2 and the connecting material C and improve the connection reliability.

In the present embodiment, an example of the material of the first conductive layer L1 is a metal film containing titanium, and the difference between the melting point of the material of the first conductive layer L1 and the melting point of the material of the first basement 10 is within 300° C. For this reason, when the second laser light LSR2 is irradiated, the fourth hole VD and the concavity CC are formed substantially at the same time, and any one of the first conductive layer L1 and the first basement 10 is not excessively heated. By doing so, the first basement 10 or the like are not scattered, such that the connection reliability can be secured without hindering the conduction between the connecting material C and the first conductive layer L1.

Second Embodiment

Subsequently, a display device DSP of the second embodiment will be described with reference to FIG. 19. It should be noted that components having functions similar to those of the display device DSP of the first embodiment are denoted by the same reference numerals, and the description thereof will be omitted. In the display device DSP of the second embodiment, the configuration of a third hole VC formed in a protective film PF is different from that of the first embodiment. Other components are the same as those of the first embodiment.

The third hole of the second embodiment includes a first portion VCA and a second portion VCB. The first portion VCA exposes a first flat portion FP1 from the protective film PF. The second portion VCB exposes a second conductive layer L2 (end portion RT) from the protective film PF.

The first portion VCA is formed in a circular shape having a diameter smaller than that of a second hole VB and is disposed so that a center axis thereof coincides with the first and second holes VA and VB, for example. The second portion VCB is disposed to be connected to the first portion VCA. The number of second portions VCB may be one or more than two. In the example illustrated in FIG. 19, the second portion VCB is formed in a circular shape having a diameter smaller than that of the first portion VCA, and eight second portions VCB are arranged at regular intervals.

Like the third hole VC in the first embodiment, the first portion VCA and the second portion VCB can be formed by the laser light. For example, after the first laser light is irradiated to form the first portion VCA, the second laser light having a diameter smaller than that of the first laser light may be irradiated plural times by moving a laser device along the circumferential direction of the first portion VCA to form the second portion VCB. Alternatively, the second portion VCB is first formed, and then the first portion VCA having a size connected to the second portion VCB can be formed.

Figure 19:
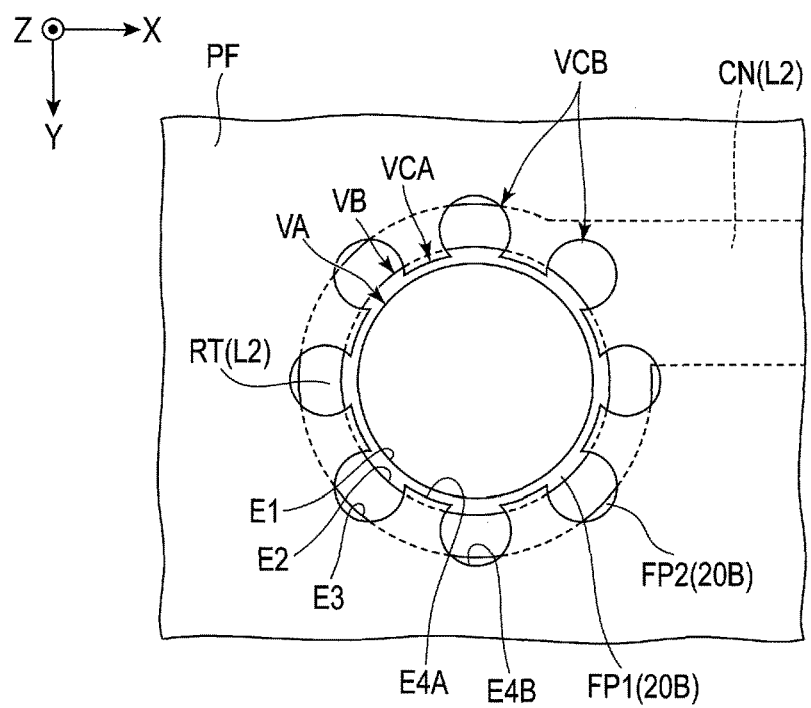
FIG. 19 is a plan view of a display device DSP of a second embodiment when viewed from a second substrate SUB2 side.

In the example illustrated in FIG. 19, an edge E4A of the first portion VCA is located between the edge E1 of the first hole VA and the edge E2 of the second hole VB. An edge E4B of the second portion VCB is connected to the edge E4A of the first portion VCA. A second flat portion FP2 in which the second main surface 20B is exposed from the terminal RT is formed between the edge E4B and the outer edge E3 of the terminal RT.

The above-mentioned connecting material C covers the first flat portion FP1, the terminal RT exposed from the second flat portion FP2, and the second flat portion FP2. Further, the above-mentioned filling material FI fills the inside of the first and second portions VCA and VCB of the third hole VC.

In the second embodiment, the second portion VCB that partially exposes the terminal RT is formed, instead of the third hole VC (see FIG. 7) that completely exposes the terminal RT. For this reason, the damage of the terminal RT caused by the radiation of the laser light can be suppressed to the minimum.

In the example illustrated in FIG. 19, the display device DSP has the plurality of second portions VCB. By doing so, since the connecting material C and the terminal RT come into contact with each other at a plurality of locations, the connection reliability can be secured even when all the terminals RT are not exposed.

As described above, according to the present embodiment, it is possible to provide an electronic device capable of narrowing the frame and reducing cost, and a method for manufacturing the same.

It should be noted that change of design may be arbitrarily added to the present invention, based on the display device described as one of the embodiments. The accompanying claims and their equivalents are intended to cover display devices modified as would fall within the scope and spirit of the inventions.

An example of the display device obtained from the structure disclosed in this specification will be appended.

(1) An electronic device, comprising:
a first substrate including a first basement and a first conductive layer;
a second substrate including a second basement and a second conductive layer; and
a connecting material electrically connecting the first conductive layer and the second conductive layer,
wherein the second basement includes a first surface, a second surface opposite to the first surface, and a first hole penetrating the second basement,
the first surface is opposed to the first conductive layer and spaced apart from the first conductive layer,
the second surface is provided with the second conductive layer,
the second conductive layer includes a second hole penetrating the second conductive layer and having a size larger than that of the first hole,
the second surface includes a first flat portion exposed from the second conductive layer between an edge of the first hole and an edge of the second hole, and
the connecting material contacts with the first conductive layer and the second conductive layer via the first hole.

(2) An electronic device, comprising:
a first substrate including a first basement and a first conductive layer;
a second substrate including a second basement and a second conductive layer; and
a connecting material electrically connects the first conductive layer and the second conductive layer,
wherein the second basement includes a first surface, a second surface opposite to the first surface, and a first hole penetrating the second basement,
the first surface is opposed to the first conductive layer and spaced apart from the first conductive layer,
the second surface is provided with the second conductive layer,
the second conductive layer includes a second hole penetrating the second conductive layer,
an edge of the second hole is located outside an edge of the first hole in a radial direction of the first hole, and
the connecting material contacts the first conductive layer and the second conductive layer via the first hole.

(3) The electronic device of item (1) or (2), wherein central axes of the first hole and the second hole coincide with each other.

(4) The electronic device of item (1), wherein
the second substrate further includes a protective film covering the second conductive layer,
the protective film includes a third hole,
the third hole penetrates the protective film and exposes the first flat portion and the second conductive layer around the first hole, and
the second surface includes a second flat portion exposed from the second conductive layer,
the second flat portion is located between an edge of the third hole and the second conductive layer, and is exposed from the protective film.

(5) The electronic device of item (4), wherein
the third hole includes a first portion and a second portion,
the first portion exposes the first flat portion from the protective film around the first hole,
the second portion partially exposes the second conductive layer from the protective film around the first portion.

(6) The electronic device of item (5), wherein
the third hole includes a plurality of second portions having a diameter smaller than that of the first portion.

(7) The electronic device of item (5), wherein in the first portion, central axes of the first hole and the second hole coincide with each other.

(8) The electronic device of any one of items (1) to (7), wherein
the second conductive layer includes:
a detector configured to be disposed in a first area and detect an object contacting or approaching the first area; and
a terminal configured to be disposed in a second area adjacent to the first area and connected to the detector, and
the first hole is formed in the terminal.

(9) A method of manufacturing an electronic device, comprising:
preparing a display panel, the display panel including a first basement
a first conductive layer over the first basement, and
a second basement comprising a first surface opposing the first conductive layer and a second surface opposite to the first surface,
wherein the first and second basements are adhered to each other, conductive layer over the second surface, which covers the second surface, and
a first flat portion which expose the second surface via the second conductive layer;
forming a first hole penetrating from the second surface to the first surface in the first flat portion; and
forming a connecting material in the first hole to electrically connect the first conductive layer and the second conductive layer to each other.

(10) The method of (9) further comprising:
forming a protective film to cover the second surface on which the second conductive layer and the first flat portion are already formed, prior to the forming of the first hole;
forming a third hole in the protective film to partially expose the first flap portion and the second conductive layer; and
irradiating second laser light to the first flat portion via the third hole, thereby forming the first hole.

(11) The method of (10), further comprising:
irradiating first laser light to the protective film, thereby forming the third hole.

What is claimed is:
1. An electronic device, comprising:
a first substrate including a first conductive layer;
a second substrate including a second conductive layer; and
a connecting material electrically connecting the first conductive layer and the second conductive layer,
wherein the second substrate includes a first surface, a second surface opposite to the first surface, and a first hole penetrating the second substrate,
the first surface is opposed to the first conductive layer and spaced apart from the first conductive layer,
the second surface is provided with the second conductive layer,
the second conductive layer includes a second hole penetrating the second conductive layer and having a size larger than that of the first hole,
the second surface includes a first flat portion exposed from the second conductive layer between an edge of the first hole and an edge of the second hole, and the connecting material contacts with the first conductive layer and the second conductive layer via the first hole.

2. The electronic device according to claim 1, wherein central axes of the first hole and the second hole coincide with each other.

3. The electronic device according to claim 1, wherein
the second substrate further includes a protective film covering the second conductive layer,
the protective film includes a third hole,
the third hole penetrates the protective film and exposes the first flat portion and the second conductive layer around the first hole, and
the second surface includes a second flat portion exposed from the second conductive layer,
the second flat portion is located between an edge of the third hole and the second conductive layer, and is exposed from the protective film.

4. The electronic device according to claim 1, wherein
the second conductive layer includes:
a detector configured to be disposed in a first area and detect an object contacting or approaching the first area; and
a terminal configured to be disposed in a second area adjacent to the first area and connected to the detector, and
the first hole is formed in the terminal.

5. The electronic device according to claim 3, wherein
the third hole includes a first portion and a second portion,
the first portion exposes the first flat portion from the protective film around the first hole,
the second portion partially exposes the second conductive layer from the protective film around the first portion.

6. The electronic device according to claim 5, wherein
the third hole includes a plurality of second portions having a diameter smaller than that of the first portion.

7. The electronic device according to claim 5, wherein in the first portion, central axes of the first hole and the second hole coincide with each other.

8. The electronic device according to claim 3, wherein central axes of the first hole, the second hole and the third hole coincide with each other.

9. An electronic device, comprising:
a first substrate including a first conductive layer;
a second substrate including a second conductive layer; and
a connecting material electrically connecting the first conductive layer and the second conductive layer,
wherein the second substrate includes a first surface, a second surface opposite to the first surface, and a first hole penetrating the second substrate,
the first surface is opposed to the first conductive layer and spaced apart from the first conductive layer,
the second surface is provided with the second conductive layer,
the second conductive layer includes a second hole penetrating the second conductive layer,
an edge of the second hole is located outside an edge of the first hole in a radial direction of the first hole, and
the connecting material contacts the first conductive layer and the second conductive layer via the first hole.

10. The electronic device according to claim 9, wherein central axes of the first hole and the second hole coincide with each other.

11. The electronic device according to claim 9, wherein the second conductive layer includes:
a detector configured to be disposed in a first area and detect an object contacting or approaching the first area; and
a terminal configured to be disposed in a second area adjacent to the first area and connected to the detector, and
the first hole is formed in the terminal.

12. The electronic device according to claim 9, wherein
the second substrate further includes a protective film covering the second conductive layer,
the protective film includes a third hole,
the third hole penetrates the protective film and exposes the first flat portion and the second conductive layer around the first hole, and
the second surface includes a second flat portion exposed from the second conductive layer,
the second flat portion is located between an edge of the third hole and the second conductive layer, and is exposed from the protective film.

13. The electronic device according to claim 12, wherein
the third hole includes a first portion and a second portion,
the first portion exposes the first flat portion from the protective film around the first hole,
the second portion partially exposes the second conductive layer from the protective film around the first portion.

14. The electronic device according to claim 13, wherein
the third hole includes a plurality of second portions having a diameter smaller than that of the first portion.

15. The electronic device according to claim 13, wherein in the first portion, central axes of the first hole and the second hole coincide with each other.

16. The electronic device according to claim 12, wherein central axes of the first hole, the second hole and the third hole coincide with each other.

* * * * *